United States Patent
Welsh et al.

(10) Patent No.: US 9,519,994 B2
(45) Date of Patent: Dec. 13, 2016

(54) SYSTEMS AND METHODS FOR RENDERING 3D IMAGE INDEPENDENT OF DISPLAY SIZE AND VIEWING DISTANCE

(75) Inventors: Richard J. Welsh, Swindon (GB); Christian Ralph, Swindon (GB)

(73) Assignee: Dolby Laboratories Licensing Corporation, San Francisco, CA (US)

(*) Notice: Subject to any disclaimer, the term of this patent is extended or adjusted under 35 U.S.C. 154(b) by 20 days.

(21) Appl. No.: 14/111,591

(22) PCT Filed: Apr. 10, 2012

(86) PCT No.: PCT/US2012/032857
§ 371 (c)(1),
(2), (4) Date: Oct. 14, 2013

(87) PCT Pub. No.: WO2012/145191
PCT Pub. Date: Oct. 26, 2012

(65) Prior Publication Data
US 2014/0043336 A1 Feb. 13, 2014

Related U.S. Application Data

(60) Provisional application No. 61/476,198, filed on Apr. 15, 2011.

(51) Int. Cl.
*G06T 15/08* (2011.01)
*H04N 19/61* (2014.01)
(Continued)

(52) U.S. Cl.
CPC .......... *G06T 15/08* (2013.01); *H04N 13/0003* (2013.01); *H04N 13/0022* (2013.01);
(Continued)

(58) Field of Classification Search
CPC .......... G06T 15/20; G06T 19/00; G06T 15/10; H04N 13/0239; H04N 13/0055; H04N 13/0296
(Continued)

(56) References Cited

U.S. PATENT DOCUMENTS

| 4,859,994 A | 8/1989 | Zola et al. |
| 5,615,046 A | 3/1997 | Gilchrist |

(Continued)

FOREIGN PATENT DOCUMENTS

| AU | 2010270951 A1 | 12/2011 |
| CN | 1947430 | 4/2007 |

(Continued)

OTHER PUBLICATIONS

Grau, O. et al, "Applications of Depth Metadata in a Production System," SMPTE Journal, 2002.

(Continued)

*Primary Examiner* — Ulka Chauhan
*Assistant Examiner* — Saptarshi Mazumder

(57) ABSTRACT

Methods and systems for providing and rendering 3D depth information are described. Specifically, the 3D depth information includes z-axis values provided in a normalized percentage format, that defines the position of an object relative to an infinity plane, a display screen, and a viewer, and can be used to render one or more images independent of display screen size and viewing distance.

9 Claims, 8 Drawing Sheets

(51) Int. Cl.
  *H04N 19/132*  (2014.01)
  *H04N 13/00*  (2006.01)
  *H04N 13/04*  (2006.01)
  *H04N 19/46*  (2014.01)
  *H04N 19/597*  (2014.01)
  *G06T 15/40*  (2011.01)

(52) U.S. Cl.
  CPC ........... *H04N 19/132* (2014.11); *H04N 19/61* (2014.11); *G06T 15/405* (2013.01); *H04N 13/0497* (2013.01); *H04N 19/46* (2014.11); *H04N 19/597* (2014.11)

(58) Field of Classification Search
  USPC .................................................. 348/42, 231
  See application file for complete search history.

(56) References Cited

U.S. PATENT DOCUMENTS

| | | | |
|---|---|---|---|
| 6,285,779 B1 * | 9/2001 | Lapidous et al. | 382/106 |
| 6,631,205 B1 | 10/2003 | Melen et al. | |
| 6,707,950 B1 | 3/2004 | Burns | |
| 6,791,540 B1 * | 9/2004 | Baumberg | 345/419 |
| 6,944,328 B2 | 9/2005 | Yoshida | |
| 7,015,920 B2 | 3/2006 | Ono | |
| 7,046,270 B2 | 5/2006 | Murata et al. | |
| 7,075,587 B2 | 7/2006 | Lee | |
| 7,177,357 B2 | 2/2007 | Yun et al. | |
| 7,274,816 B2 | 9/2007 | Yoshida | |
| 7,692,640 B2 | 4/2010 | Van Geest | |
| 7,787,658 B2 | 8/2010 | Redert | |
| 8,166,042 B1 * | 4/2012 | Praun et al. | 707/743 |
| 8,290,244 B2 | 10/2012 | Ha | |
| 8,451,326 B2 | 5/2013 | Inaba | |
| 9,215,435 B2 | 12/2015 | Tourapis et al. | |
| 2002/0015103 A1 | 2/2002 | Shi | |
| 2003/0043270 A1 * | 3/2003 | Rafey et al. | 348/157 |
| 2003/0103062 A1 | 6/2003 | Lee et al. | |
| 2004/0233275 A1 | 11/2004 | Tomita | |
| 2005/0053159 A1 * | 3/2005 | Sugimoto | 375/240.26 |
| 2005/0146521 A1 | 7/2005 | Kaye et al. | |
| 2005/0254702 A1 * | 11/2005 | Era | 382/154 |
| 2006/0088206 A1 | 4/2006 | Era | |
| 2006/0103664 A1 | 5/2006 | Nakanishi | |
| 2007/0008575 A1 | 1/2007 | Yu et al. | |
| 2007/0035618 A1 | 2/2007 | Yoshida | |
| 2007/0041444 A1 | 2/2007 | Novelo | |
| 2007/0047040 A1 | 3/2007 | Ha | |
| 2007/0146232 A1 | 6/2007 | Redert et al. | |
| 2007/0247522 A1 * | 10/2007 | Holliman | 348/46 |
| 2007/0257902 A1 | 11/2007 | Satoh et al. | |
| 2007/0288844 A1 | 12/2007 | Zingher et al. | |
| 2008/0018784 A1 * | 1/2008 | Bennett | 348/439.1 |
| 2008/0129864 A1 | 6/2008 | Stone et al. | |
| 2008/0158345 A1 | 7/2008 | Schklair | |
| 2008/0278487 A1 | 11/2008 | Gobert | |
| 2008/0303813 A1 | 12/2008 | Joung et al. | |
| 2009/0092335 A1 | 4/2009 | Kim et al. | |
| 2009/0142041 A1 | 6/2009 | Nagasawa et al. | |
| 2009/0259941 A1 * | 10/2009 | Kennedy, Jr. | 715/719 |
| 2009/0315979 A1 | 12/2009 | Jung et al. | |
| 2009/0315980 A1 | 12/2009 | Jung | |
| 2010/0005491 A1 | 1/2010 | Corl | |
| 2010/0021141 A1 | 1/2010 | Yamashita et al. | |
| 2010/0045779 A1 * | 2/2010 | Kwon | H04N 5/44504 348/46 |
| 2010/0067873 A1 | 3/2010 | Sasaki | |
| 2010/0086285 A1 | 4/2010 | Sasaki | |
| 2010/0103168 A1 | 4/2010 | Jung | |
| 2010/0142924 A1 | 6/2010 | Yamashita et al. | |
| 2010/0157025 A1 | 6/2010 | Suh et al. | |
| 2010/0158099 A1 | 6/2010 | Kalva | |
| 2010/0165081 A1 | 7/2010 | Jung | |
| 2010/0195716 A1 | 8/2010 | Klein Gunnewiek | |
| 2010/0208040 A1 | 8/2010 | Guillou | |
| 2010/0220175 A1 | 9/2010 | Claydon et al. | |
| 2010/0303444 A1 | 12/2010 | Sasaki et al. | |
| 2011/0032328 A1 | 2/2011 | Raveendran | |
| 2011/0135005 A1 | 6/2011 | Tourapis et al. | |
| 2011/0142138 A1 * | 6/2011 | Tian et al. | 375/240.24 |
| 2011/0149036 A1 | 6/2011 | Suh et al. | |
| 2011/0170792 A1 | 7/2011 | Tourapis et al. | |
| 2011/0242104 A1 | 10/2011 | Zhang et al. | |
| 2011/0292222 A1 * | 12/2011 | Klein | 348/207.1 |
| 2012/0056874 A1 * | 3/2012 | Kim et al. | 345/419 |
| 2012/0099836 A1 | 4/2012 | Welsh | |
| 2012/0319945 A1 * | 12/2012 | McCarthy et al. | 345/156 |

FOREIGN PATENT DOCUMENTS

| | | |
|---|---|---|
| CN | 101180653 A | 5/2008 |
| DE | 19545356 A1 | 5/1996 |
| EP | 0777393 A2 | 6/1997 |
| EP | 1089573 A2 | 4/2001 |
| EP | 1744564 A1 | 1/2007 |
| EP | 1912446 A1 | 4/2008 |
| EP | 2202992 | 6/2010 |
| GB | 2413910 A | 11/2005 |
| JP | H09-172654 | 6/1997 |
| JP | 2001218229 A | 8/2001 |
| JP | 2003009185 | 1/2003 |
| JP | 2004220127 A | 8/2004 |
| JP | 2004274125 A | 9/2004 |
| JP | 2006325165 A | 11/2006 |
| RU | 2237283 C2 | 9/2004 |
| RU | 2340116 C1 | 11/2008 |
| WO | 9837698 A1 | 8/1998 |
| WO | 9930280 A1 | 6/1999 |
| WO | 0180548 A2 | 10/2001 |
| WO | 2004030375 A1 | 4/2004 |
| WO | 2004059980 A1 | 7/2004 |
| WO | 2006111893 A1 | 10/2006 |
| WO | 2007064159 A1 | 6/2007 |
| WO | 2007066868 A1 | 6/2007 |
| WO | 2007092647 A2 | 8/2007 |
| WO | 2008030011 A1 | 3/2008 |
| WO | 2008038025 A1 | 3/2008 |
| WO | 2008038205 A2 | 3/2008 |
| WO | 2008044191 A2 | 4/2008 |
| WO | 2008063170 A1 | 5/2008 |
| WO | 2008115222 A1 | 9/2008 |
| WO | 2008122838 A1 | 10/2008 |
| WO | 2008/139351 | 11/2008 |
| WO | 2008/153313 | 12/2008 |
| WO | 2009/002115 | 12/2008 |
| WO | 2008150111 A1 | 12/2008 |
| WO | 2009004742 A1 | 1/2009 |
| WO | 2009/027923 | 3/2009 |
| WO | 2009/034519 | 3/2009 |
| WO | 2009/157701 | 12/2009 |
| WO | 2010010521 A2 | 1/2010 |
| WO | 2010011557 A2 | 1/2010 |
| WO | 2010/021666 | 2/2010 |
| WO | 2010/023592 | 3/2010 |
| WO | 2010039417 A1 | 4/2010 |
| WO | 2010/053246 | 5/2010 |
| WO | 2010064118 A1 | 6/2010 |
| WO | 2010070567 A1 | 6/2010 |
| WO | 2010/074437 | 7/2010 |
| WO | 2010151555 A1 | 12/2010 |
| WO | 2011005025 A2 | 1/2011 |
| WO | 2011005544 A1 | 1/2011 |
| WO | 2011006104 A1 | 1/2011 |
| WO | 2011/013030 | 2/2011 |

OTHER PUBLICATIONS

Bruls, W. et al, "Enabling Introduction of Stereoscopic (3D) Video: Compression Standards & its Impact on Display Rendering," ICCE, 2007.

(56) References Cited

OTHER PUBLICATIONS

Fehn, C. et al, "An Advanced 3DTV Concept Providing Interoperability and Scalability for a Wide Range of Multi-Baseline Geometries," IEEE, 2006.
Fehn, C., "Depth-Image-Based Rendering (DIBR), Compression, and Transmission for a New Approach on 3D-TV," SPIE 2004.
Coll, B. et al, "3DTV at Home: Status, Challenges, and Solutions for Delivering a High Quality Experience," 2010.
Thomas, G. et al, "3D Image Acquisition for TV & Film Production," IEEE, 2002.
1-PCT International Search Report mailed on Jul. 9, 2012 for PCT Application PCT/US2012/032857 filed on Apr. 10, 2012 in the name of Dolby Laboratories Licensing Corporation.
2-PCT Written Opinion mailed on Jul. 9, 2012 for PCT Application PCT/US2012/032857 filed on Apr. 10, 2012 in the name of Dolby Laboratories Licensing Corporation.
3-PCT International Preliminary Report on Patentability completed Apr. 18, 2013 for PCT Application PCT/US2012/032857 filed on Apr. 10, 2012 in the name of Dolby Laboratories Licensing Corporation.
4- Corrected PCT International Preliminary Report on Patentability completed Oct. 8, 2013 for PCT Application PCT/US2012/032857 filed on Apr. 10, 2012 in the name of Dolby Laboratories Licensing Corporation.
"Gali-3D, Adding stereoscopic subtitles to your movies by the help of ffdshow!" retrieved on Mar. 31, 2011 from http://www.gali-3d.com/archive/articles/ffdshow-manual/ffdshow_stereo_subtitles.php.
3dTV virtual realities stereoscopic subtitle guide, retrieved on Mar. 31, 2011 from http://www.3dtv.at/Knowhow/Subtitles_en.aspx.
AviSynth, Main Page Mediawiki, starting from Aug. 5, 2007, the documentation on this site is released under the CreativeCommons Attribution-ShareAlike 3.0 License.
CEA Standard Digital Television (DTV) Closed Captionining, CEA-708-D, Aug. 2008, published by Consumer Electronics Association.
Chinese Office Action issued on Aug. 26, 2014 for Chinese Application 201080027974.9 filed on Jun. 22, 2010 in the name of Dolby Laboratories Licensing Corporation (English translation only).
Code for the Edge Detection and Image Segmentation System; new version with significant updates made available on Apr. 14, 2003 and small modification on the command line in the source file: May 5, 2009.
English translation of the First Office Action issued on Jan. 6, 2014 for Chinese Patent Application No. 201080027974.9 filed on Jun. 22, 2010 in the name of Dolby Laboratories Licensing Corporation.
English Translation of the Search Report for Chinese Patent Application No. 201080027974.9 filed on Jun. 22, 2010 in the name of Dolby Laboratories Licensing Corporation, issued on Jan. 6, 2014.
Examiner's Answer for U.S. Appl. No. 13/380,160, filed Dec. 22, 2011 in the name of Richard J. Welsh. date issued: Nov. 3, 2014.
Eyeon Fusion video graphic into movie by Eyeon Software; copyright 1988-2010.
Final Office Action mailed on Sep. 17, 2013 for U.S. Appl. No. 13/380,160, filed Dec. 22, 2011 in the name of Dolby Laboratories, Inc.
Hutchison, D., "Introducing DLP 3-D TV, DLP" Texas Instruments, Jan. 2008, 1-5.

International Preliminary Report on Patentability for PCT Application No. PCT/US2010/039543 filed on Jun. 22, 2010 in the name of Dolby Laboratories Licensing Corporation; mail date: Oct. 12, 2011.
Koster, et al., Use two video-display processors to achieve 3-D, overlay effects, EDN May 31, 1984, 135-148.
McCormick, et al., Implementation of stereoscopic and dualview images on a micro-display high definition television, 3DTV-Con'08, May 28-30, 2008, 33-36.
Non-Final Office Action for U.S. Appl. No. 13/380,160, filed Dec. 22, 2011 in the name of Richard J. Welsh. date issued: Jun. 10, 2014.
Non-final Office Action mailed on Mar. 19, 2013 for U.S. Appl. No. 13/380,160, filed Dec. 22, 2011 in the name of Dolby Laboratories, Inc.
Patent Board Decision on Appeal for U.S. Appl. No. 13/380,160, filed Dec. 22, 2011 in the name of Richard J. Welsh. date issued: May 1, 2015.
PCT Informal Communication mailed on Sep. 20, 2011 for International Application PCT/US2010/039547 filed on Jun. 22, 2010 in the name of Dolby Laboratories Licensing Corporation.
Response to Informal Communication of International Application PCT/US2010/039543 filed on Jun. 22, 2010 in the name of Dolby Laboratories Licensing Corporation.
Response to PCT Informal Communication of International Application PCT/US2010/039547 filed on Jun. 22, 2010 in the name of Dolby Laboratories Licensing Corporation.
Response to PCT Written Opinion of International Application PCT/US2010/039547 filed on Jun. 22, 2010 in the name of Dolby Laboratories Licensing Corporation.
Sokolova, et al., "Experiments in Stereo Vision" Computer Science 570, Final Project, Zitnick-Kanade Stereo Algorithm, last edited Dec. 12, 2006.
Translation of Office Action issued for related Russian patent application No. 2012101829/07 (002475) filed Jun. 22, 2010 in the name of Dolby Laboratories Licensing Corporation, mailed Jun. 2013.
Yasuda, T. et al., "A Study of 3D Image Generating Method using Server Rendering" The Institute of Electronics, Information and Communication Engineers, 19th data Engineering Workshop Theses, Japan, The Institute of Electronics, Information and Communications Engineers, Special Committee for Data Engineering Research, Apr. 7, 2008. Abstract in English.
Non-Final Office Action for U.S. Appl. No. 13/380,020, filed Dec. 21, 2011 on behalf of Alexandros Tourapis. Mail Date: Jun. 2, 2015. 24 pages.
Notice of Allowance for U.S. Appl. No. 13/380,020, filed Dec. 21, 2011 on behalf of Alexandros Tourapis. Mail Date: Sep. 11, 2015. 7 pages.
Non-Final Office Action for U.S. Appl. No. 13/040,449, filed Mar. 4, 2011 on behalf of James Dougherty. Mail Date: Jun. 21, 2013. 14 pages.
Non-Final Office Action for U.S. Appl. No. 13/040,449, filed Mar. 4, 2011 on behalf of James Dougherty. Mail Date: Aug. 28, 2014. 11 pages.
Non-Final Office Action for U.S. Appl. No. 13/040,449, filed Mar. 4, 2011 on behalf of James Dougherty. Mail Date: Feb. 2, 2015. 17 pages.
Final Office Action for U.S. Appl. No. 13/040,449, filed Mar. 4, 2011 on behalf of James Dougherty. Mail Date: Nov. 4, 2015. 14 pages.
Advisory Action for U.S. Appl. No. 13/040,449, filed Mar. 4, 2011 on behalf of James Dougherty. Mail Date: Apr. 19, 2016. 5 pages.

\* cited by examiner

| LAYER | SET | SUBSET | RESOLUTION H | RESOLUTION V | PROFILE | | | |
|---|---|---|---|---|---|---|---|---|
| | Cinema | Full Container | | | | | | |
| 14 | C | C | 8192 | 4320 | L | 14 | C | C |
| 13 | C | C | 4096 | 2160 | L | 13 | C | C |
| 12 | C | C | 2048 | 1080 | L | 12 | C | C |
| 11 | C | C | 1024 | 540 | L | 11 | C | C |
| 10 | C | C | 512 | 270 | L | 10 | C | C |
| 9 | C | C | 256 | 135 | L | 9 | C | C |
| 8 | C | C | 128 | 68 | L | 8 | C | C |
| 7 | C | C | 64 | 34 | L | 7 | C | C |
| 6 | C | C | 32 | 17 | L | 6 | C | C |
| 5 | C | C | 16 | 8 | L | 5 | C | C |
| 4 | C | C | 8 | 4 | L | 4 | C | C |
| 3 | C | C | 4 | 2 | L | 3 | C | C |
| 2 | C | C | 2 | 1 | L | 2 | C | C |
| 1 | C | C | 1 | 1 | L | 1 | C | C |
| 0 | C | C | 0 | 0 | L | 0 | C | C |
| | Cinema | 1.85:1 Flat | | | | | | |
| 14 | C | F | 7992 | 4320 | L | 14 | C | F |
| 13 | C | F | 3996 | 2160 | L | 13 | C | F |
| 12 | C | F | 1998 | 1080 | L | 12 | C | F |
| 11 | C | F | 999 | 540 | L | 11 | C | F |
| 10 | C | F | 500 | 270 | L | 10 | C | F |
| 9 | C | F | 250 | 135 | L | 9 | C | F |
| 8 | C | F | 125 | 68 | L | 8 | C | F |
| 7 | C | F | 62 | 34 | L | 7 | C | F |
| 6 | C | F | 31 | 17 | L | 6 | C | F |
| 5 | C | F | 16 | 8 | L | 5 | C | F |
| 4 | C | F | 8 | 4 | L | 4 | C | F |
| 3 | C | F | 4 | 2 | L | 3 | C | F |
| 2 | C | F | 2 | 1 | L | 2 | C | F |
| 1 | C | F | 1 | 1 | L | 1 | C | F |
| 0 | C | F | 0 | 0 | L | 0 | C | F |

*FIG. 5A*

| | Cinema | 2.39:1 Scope | | | | | | |
|---|---|---|---|---|---|---|---|---|
| 14 | C | S | 8192 | 3428 | | L | 14 | C | S |
| 13 | C | S | 4096 | 1714 | | L | 13 | C | S |
| 12 | C | S | 2048 | 858 | | L | 12 | C | S |
| 11 | C | S | 1024 | 429 | | L | 11 | C | S |
| 10 | C | S | 512 | 215 | | L | 10 | C | S |
| 9 | C | S | 256 | 107 | | L | 9 | C | S |
| 8 | C | S | 128 | 54 | | L | 8 | C | S |
| 7 | C | S | 64 | 27 | | L | 7 | C | S |
| 6 | C | S | 32 | 13 | | L | 6 | C | S |
| 5 | C | S | 16 | 7 | | L | 5 | C | S |
| 4 | C | S | 8 | 3 | | L | 4 | C | S |
| 3 | C | S | 4 | 2 | | L | 3 | C | S |
| 2 | C | S | 2 | 1 | | L | 2 | C | S |
| 1 | C | S | 1 | 1 | | L | 1 | C | S |
| 0 | C | S | 0 | 0 | | L | 0 | C | S |
| | Broadcast | HD1080 | | | | | | | |
| 12 | B | H | 1920 | 1080 | | L | 12 | B | H |
| 11 | B | H | 960 | 540 | | L | 11 | B | H |
| 10 | B | H | 480 | 270 | | L | 10 | B | H |
| 9 | B | H | 240 | 135 | | L | 9 | B | H |
| 8 | B | H | 120 | 68 | | L | 8 | B | H |
| 7 | B | H | 60 | 34 | | L | 7 | B | H |
| 6 | B | H | 30 | 17 | | L | 6 | B | H |
| 5 | B | H | 15 | 8 | | L | 5 | B | H |
| 4 | B | H | 8 | 4 | | L | 4 | B | H |
| 3 | B | H | 4 | 2 | | L | 3 | B | H |
| 2 | B | H | 2 | 1 | | L | 2 | B | H |
| 1 | B | H | 1 | 1 | | L | 1 | B | H |
| 0 | B | H | 0 | 0 | | L | 0 | B | H |
| | Broadcast | HD720 | | | | | | | |
| 12 | B | W | 1280 | 720 | | L | 12 | B | W |
| 11 | B | W | 640 | 360 | | L | 11 | B | W |
| 10 | B | W | 320 | 180 | | L | 10 | B | W |
| 9 | B | W | 160 | 90 | | L | 9 | B | W |
| 8 | B | W | 80 | 45 | | L | 8 | B | W |
| 7 | B | W | 40 | 23 | | L | 7 | B | W |
| 6 | B | W | 20 | 11 | | L | 6 | B | W |
| 5 | B | W | 10 | 6 | | L | 5 | B | W |
| 4 | B | W | 5 | 3 | | L | 4 | B | W |
| 3 | B | W | 3 | 1 | | L | 3 | B | W |
| 2 | B | W | 1 | 1 | | L | 2 | B | W |
| 1 | B | W | 1 | 1 | | L | 1 | B | W |

*FIG. 5B*

SYSTEMS AND METHODS FOR RENDERING 3D IMAGE INDEPENDENT OF DISPLAY SIZE AND VIEWING DISTANCE

CROSS-REFERENCE TO RELATED APPLICATIONS

This application claims priority to U.S. provisional patent application No. 61/476,198 filed 15 Apr. 2011, which is hereby incorporated in its entirety.

FIELD OF INVENTION

The present teachings relate to rendering of 3D images. In particular, the present teachings relate to systems and methods for using z-axis values provided in a percentage format, for rendering 3D images independent of display size and viewing distance.

BACKGROUND OF INVENTION

A 3D image is typically rendered using z-axis information provided in the form of depth metadata associated with the image. For example, when a 3D image is captured using a stereoscopic camera, the depth metadata may be provided in the form of a grayscale difference image. The grayscale difference image does not necessarily provide absolute depth values, but does provide information in terms of differences in depth corresponding to the edges of objects contained in the image. This approach may prove useful in rendering images of a certain quality. However, it proves inadequate for more complex applications requiring 3D depth information that goes beyond stereoscopic imaging.

In an alternative approach, an arbitrary rendering volume is selected for rendering an image, and certain absolute z-axis depth values are chosen for providing depth information. While this approach may prove adequate for image reproduction on a display screen of a specific size, it generally fails to accommodate multiple display screen sizes, as well as a range of viewing distances, thereby leading to some objects being located at inappropriate perceived depths within the reproduced image on certain display screens. As one example of an inappropriate perceived depth, an object may appear to be located beyond viewer infinity. When this occurs, a viewer may suffer from an undesirable divergence of the eyes. As a further example of an inappropriate perceived depth, an object may appear to be located very close to the viewer. Such differences in perceived depth may also lead to other problems such as viewer fatigue, eyestrain, and headache.

Thus, it is desirable to provide 3D depth information in a manner that accommodates the displaying of images in a variety of display screens while also accommodating a range of viewing distances.

BRIEF DESCRIPTION OF THE DRAWINGS

FIGS. 5A and 5B provide layer and resolution information for several different profiles.

DETAILED DESCRIPTION

Figure 1:
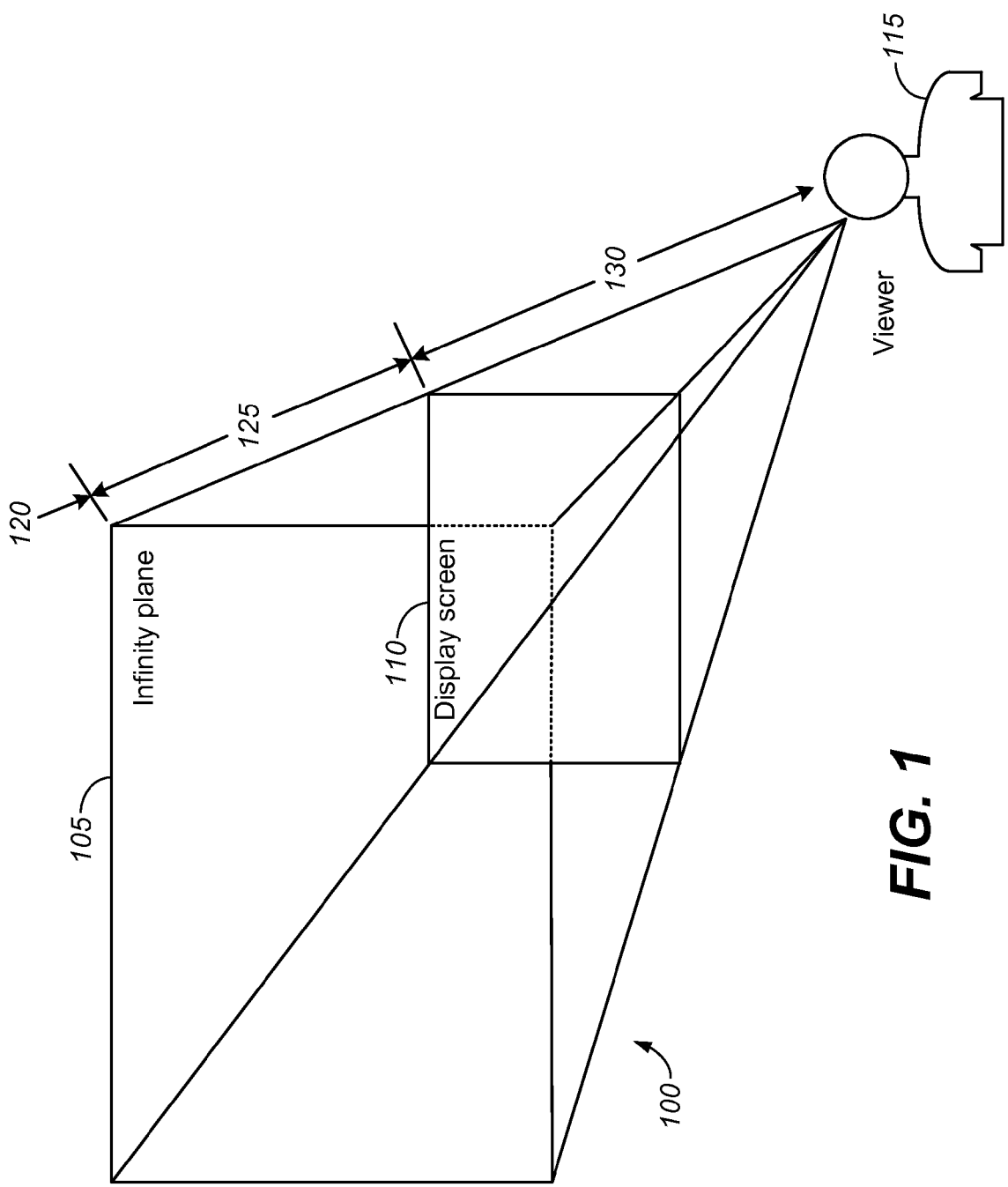
FIG. 1 shows an imaging volume that encompasses an infinity plane, a display screen plane, and a viewer location.

Throughout this description, embodiments and variations are described for the purpose of illustrating uses and implementations of the inventive concept. The illustrative description should be understood as presenting examples of the inventive concept, rather than as limiting the scope of the concept as disclosed herein. For example, it will be understood that description provided below with respect to one aspect of rendering images (for example, data transmission) may be equally pertinent to various other operations such as image reproduction, image projection, image display etc. It will also be understood that the term "image" is used herein solely for purposes of convenience. In various alternative embodiments the term "image" should be interpreted in the context of multiple images such as for example, in the context of a video stream or a collection of static images. A person of ordinary skill in the art will recognize the generality and applicability of the various concepts and methods disclosed herein to various fields and applications. Furthermore, it will be understood that the concept of generating and/or transmitting depth information as disclosed herein may be used in various other applications where other types of data are used.

The 3D metadata specifically referred to herein, pertains to providing depth information in the form of percentage z-axis depth values rather than using absolute z-axis depth values. The percentage z-axis depth values may be further translated into a set of normalized z-axis depth values that are derived by assuming a virtual display screen. This process, which will be described below in more detail, permits providing of depth information (in the form of a profile), independent of the nature of the display screen (different resolutions, different screen aspect ratios, etc) or viewing distance between a human viewer and the display screen.

The profile, which is transmitted in the form of 3D depth metadata along with image data, can be used by a receiver to derive depth information of various objects contained in the image. This information can be used not only for accurately reconstructing the original image, but may be also used to insert (or delete) objects such as subtitles, live graphics or captions, from the image. As can be appreciated, insertion of an object into a 2D image is a relatively straight-forward process that does not require depth information. However, inserting an object in 3D space requires an accurate assessment of depth in order to avoid undesirable results. For example, an object that is meant to be inserted behind an existing object may be incorrectly rendered in front of the existing object. Thus the inserted object appears by occlusion to be in front of existing objects in the image whilst appearing by inter-ocular disparity to be behind the existing objects. This conflict confuses the human visual system, which then disturbs the illusion of depth that is intended to be provided in the image. In order to avoid this situation, it is desirable that the inserted object be placed in the image by taking care of the position of various objects already existing in the 3D image. Whilst this process can be carried out by a human being, using a visual inspection process, it can be appreciated that such a solution is extremely time consuming and may be neither practical nor desirable for post-production image editing or for manipulating images during broadcast of pre-recorded content (especially if the broadcast is a live broadcast).

Attention is now drawn to FIG. 1, which shows an imaging volume 100 that encompasses an infinity plane 105, a display screen 110, and a viewer 115 located in front of the display screen 110. Infinity plane 105 is located at a depth wherein left/right images are separated negatively (left eye image located left of center and right eye image located right of center) by an amount that is substantially equal to an interocular separation. Interocular separation may be assumed to be approximately equal to 65 mm (average value for an adult). The plane of the display screen 110 corresponds to a location wherein a physical or a virtual screen is located. The display screen 110 is used for displaying a 3D image having objects perceptually located both in front of, and behind, the screen. A first portion located in front of the display screen 110 is referred to herein as positive volume 130 of imaging volume 100. A second portion located between display screen 110 and infinity plane 105, is referred to herein as negative real volume 125 of imaging volume 100. A third portion that is located beyond infinity plane 105 (beyond viewer infinity) is referred to herein as negative imaginary volume 120.

In certain applications, imaginary volume 120 may be used for artistic reasons to "cheat" depth perception and provide a viewer a reference point for infinity when viewing an image. Specifically, in this case, it may be desirable to accentuate a separation distance for a set of objects by locating some of these objects in a "real" negative space ahead of infinity plane 105 and placing some others in an "imaginary" space behind infinity plane 105.

Characterizing of imaging volume 100 into distinct portions as described above, recognizes an intrinsic relationship that exists between viewer 115 and the display device (display screen 110) for interpreting depth information, rather than using absolute values that ignore this intrinsic relationship. The simplest method for characterizing depth in a stereoscopic display is pixel separation as viewed between a right eye and a left eye. However, the relationship between pixel separation and perceived depth is non-linear in nature and unsuitable for accurate measurement or placement of objects in 3D space.

Figure 2:
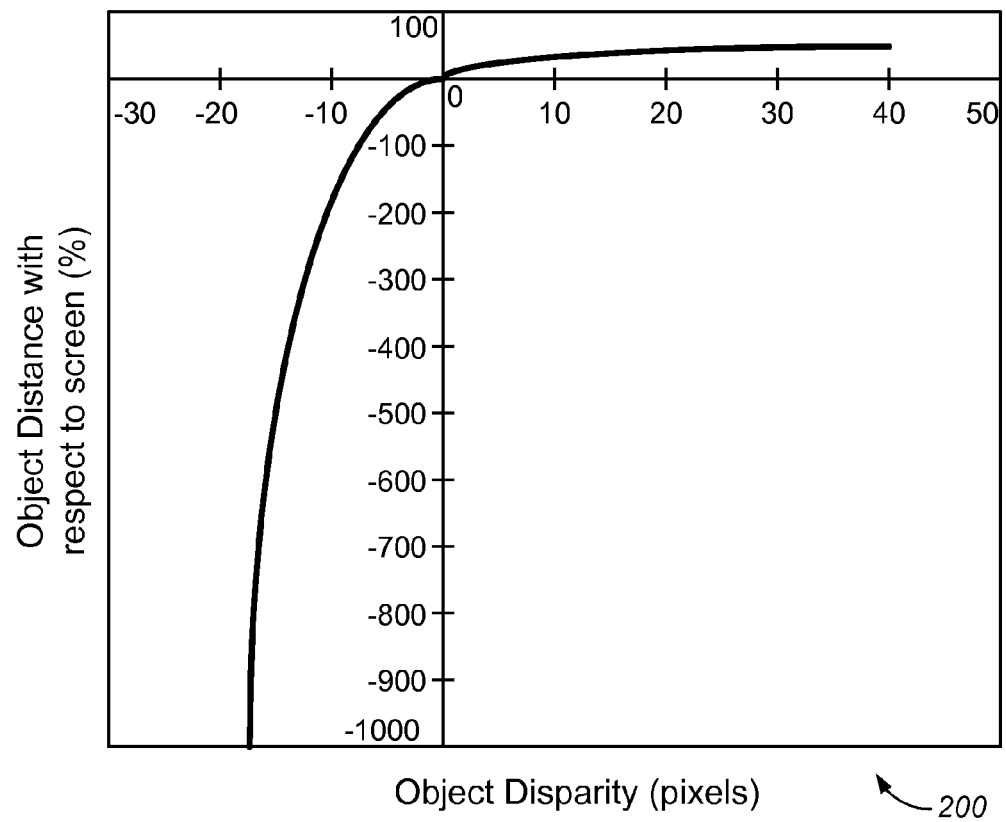
FIG. 2 shows a graph indicating a relationship between object disparity and object distance with respect to screen.

FIG. 2 shows a graph 200 displaying the non-linear relationship between object disparity and perceived object depth (represented in FIG. 2 as an object distance (%) with respect to a 7-meter wide screen having a horizontal resolution of 2048 pixels). However, one or more handicaps associated with using this non-linear relationship can be addressed by using a percentage of object distance with respect to the viewer and the viewing planes ($z_{pv}$) as the value for the z-axis (depth) the perceived depth can be defined in a perceptually linear manner that is independent of display size and viewer distance.

To elaborate upon this aspect, let it be assumed that display screen 110 is located at a point that is referred to herein as a 0% point ($z_{pv}$). A point located midway between display screen 110 and viewer 115 is referred to herein as a +50% point ($z_{pv}$), and another point located between display screen 110 and infinity plane 105 is referred to herein as a −50% point ($z_{pv}$). Consequently, in a first instance, when an object contained in a 3D image is defined as having a $z_{pv}$ value corresponding to the +50% point, the object will always be perceived as being located half-way between viewer 115 and display screen 110. On the other hand, when the object is defined as having a $z_{pv}$ value corresponding to the 0% point, the object will be perceived as being located on the plane of the display screen 110, or in other words, twice as far from viewer 115 as in the first instance. Similarly, when the object is defined as having a $z_{pv}$ value corresponding to the −50% point, the object will be perceived as being located behind the plane of the display screen 110, halfway between the screen plane and viewer infinity.

As viewer 115 moves closer to display screen 110, the object would appear closer to viewer 115, and conversely, the object would appear to be located further away when viewer 115 moves away from display screen 110. Therefore, using the percentage z-axis approach ($z_{pv}$) for viewing an object in a proportional/relative manner makes the perceived depth of the object independent of viewer distance (i.e. independent of absolute z-axis values).

As pointed out above, FIG. 2 is based on a 7-meter wide screen having a horizontal resolution of 2048 pixels. However, in order to use the ($z_{pv}$) value in a practical manner that makes it independent of display size, the physical screen width ($w_s$) of display screen 110 must also be taken into consideration. To do so, a combination of x, y, $z_{pv}$ and $w_s$ values may be used, wherein x is an x-axis value, y is a y-axis value, $z_{pv}$ is the percentage object distance, and $w_s$ is the screen size.

In some cases, display screen 110 may be a virtual screen rather than a real screen. For example, when software is used for calculating various 3D parameters, it may be more convenient to use a virtual screen and normalized screen values. Under this scenario, $z_{pv}$ may be used in the form of a normalized z-value ($z_n$).

Specifically, in one embodiment, a normalized screen size of 1 mm per pixel width is used. Thus, a 1000 pixel wide screen is normalized to 1000 mm (1 m). The normalized screen size may be appropriately changed to actual size by rendering software that is executed for rendering the image on a display screen of a particular size.

Figure 3:
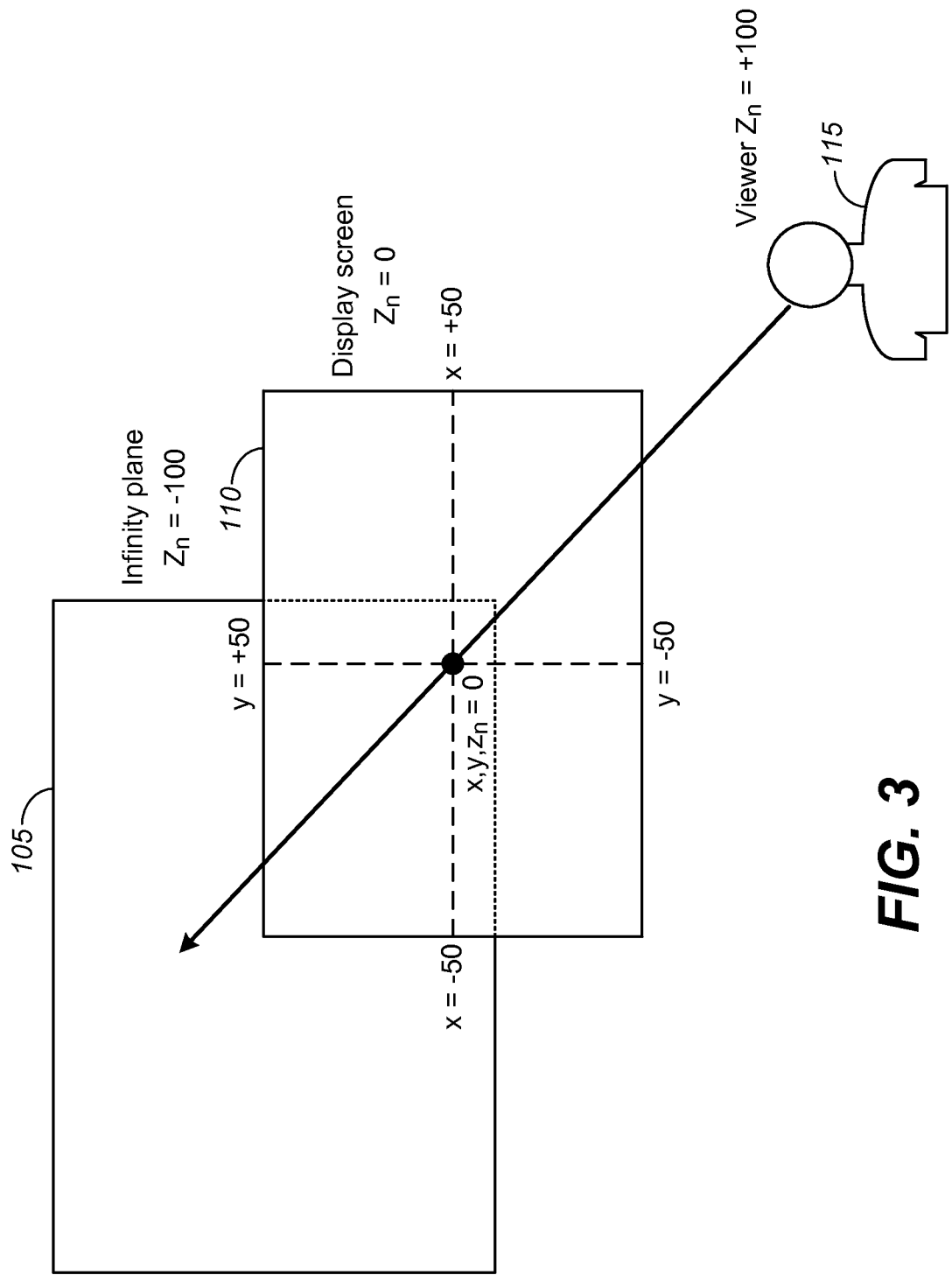
FIG. 3 shows normalized depth values for the infinity plane, the display screen plane, and the viewer location.

FIG. 3 shows normalized depth values for infinity plane 105, display screen 110, and viewer 115. On the normalized display screen 110, the separation distance between objects is substantially equal to zero, while the separation distance between objects on infinity plane 105 is presumed to be approximately equal to 65 pixels in one embodiment. When an object is located between display screen 110 and viewer 115, $z_n$ has a positive value ($z_n>0$); when located on display screen 110 $z_n=0$; when located between display screen 110 and infinity plane 105 $z_n$ has a negative value ($z_n<0$); and when located on infinity plane 105 $z_n=-100$. Using these values, the pixel separation (Sp) in an image can be defined by the following equations:

$$S_p = z_n \left[ \frac{65}{100 - z_n} \right] \text{ (when } z_n > 0\text{)}$$

When an object is perceived as being located at the plane of display screen 110 ($z_n=0$), the equation above reduces to $S_p=0$.

On the other hand, when the object is perceived as being located behind the display screen 110 towards and beyond infinity plane 105 ($z_n<0$), the equation reduces to $S_p=0.65z_n$.

Drawing attention to display screen 110, several coordinate values are shown in a x, y, $z_n$ format. As can be understood, $z_n=0$ at this plane, and the x, y values shown at different points on display screen 110 reflect this value. Similarly, x, y, $z_n$ values can be used to denote x, y coordinates coupled with normalized perceived depth information $z_n$ for any number of points within the viewing volume. This combination of x, y, $z_n$ values (where x represents screen width as a percentage, y represents screen height as a percentage, and $z_n$ represents perceived depth as a percentage) can be transmitted from an image transmitter and used at a receiving device for rendering perceived depth in the image independent of display screen size or viewing distance. In one specific application, $z_n$ is expressed to two decimal places, which enables about 20,000 perceptually linear depth points between viewer 115 and the infinity plane. This is suitable for a granularity of 0.5 pixels separation at infinity on a 10,000 pixel wide normalized image.

Figure 10:
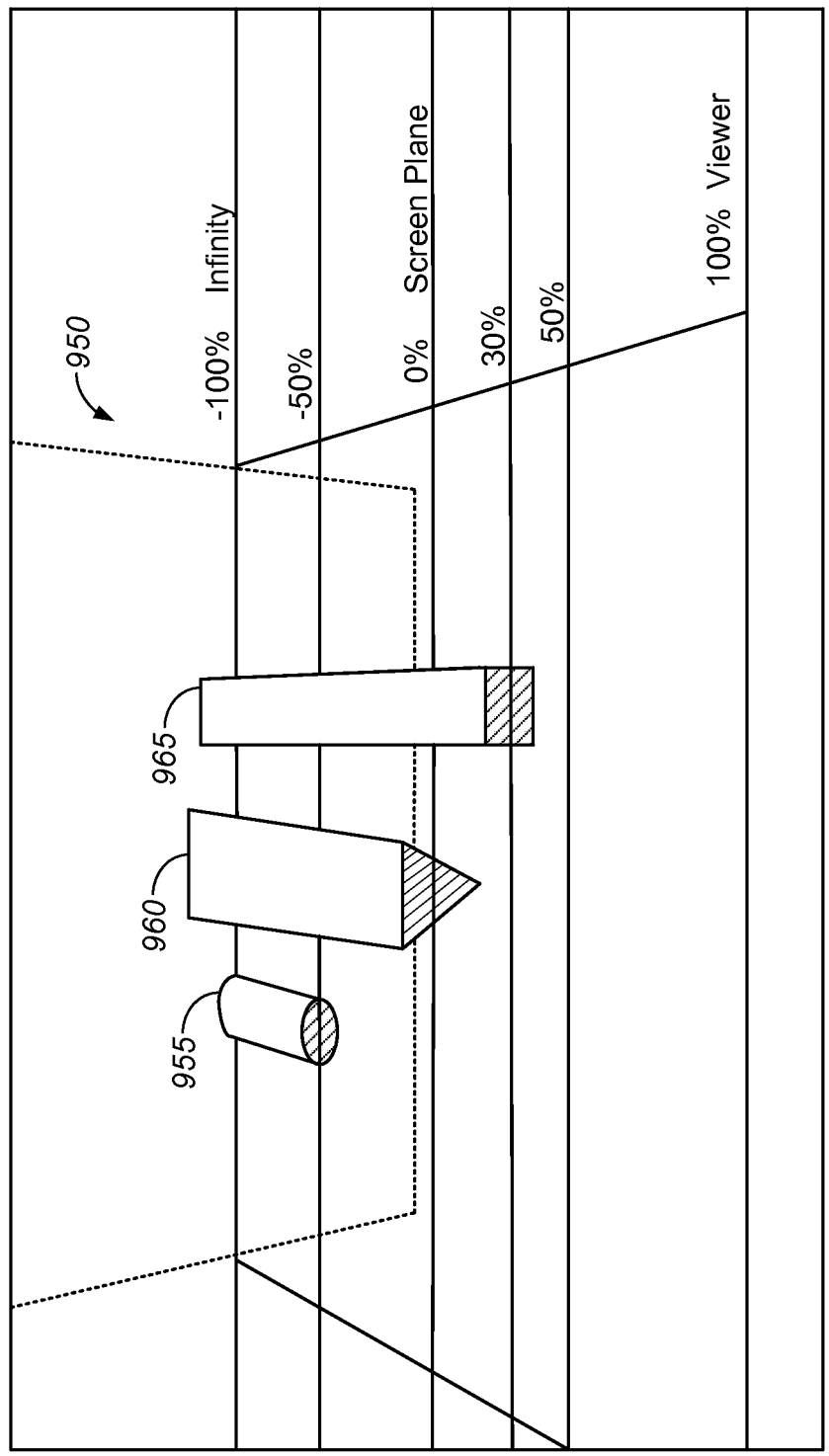
FIG. 10 shows an extruded depth diagram of three objects to illustrate corrective calculations to provide desired depth perception for the three objects.

Depth information, specifically 3D depth information, may be transmitted as 3D metadata together with image data, and used by a receiving device for rendering perceived depth in a reproduced image. Some aspects of this process will be described below in more detail. Specifically, FIG. 10 is used below to describe display size corrective calculations based on normalized z-values ($z_n$).

In accordance with various embodiments in accordance with the invention, the 3D metadata may be configured in the form of a variety of profiles, one or more of which may be selected for transmission in various payloads.

Furthermore, the 3D metadata may be used to provide various types of depth related information. A few examples include: a) Maximum depth, b) Minimum depth, c) Average depth, d) ROI depth, e) Depth data profile, and f) Depth map. It should be understood that this list of examples is not a comprehensive list, and also, that some of this information may be used in an optional manner, specifically by excluding such information in certain embodiments.

Maximum depth is typically the z-axis value for the foremost part of an image (closest to viewer 115). The Minimum depth is typically the z-axis value for the rearmost part of an image (furthest from viewer 115). ROI depth is typically associated with a region of interest (if determined) and provides an average depth of a primary object or a portion of the image in the region of interest. The Depth data profile is a predefined or arbitrarily defined resolution of a depth map, while the Depth map itself is a representation of the maximum depth at any given point in the image. The highest available spatial resolution for this Depth map is assumed to be equal to or greater than the original image pixel resolution.

The Depth map may be further categorized as either a Primary depth map or a Secondary depth map depending upon the type of image information that is contained therein. Specifically, the Primary depth map provides image information at, or greater than, the spatial resolution of an original image. The Secondary depth map provides image information at a spatial resolution that is less than the original image.

The Primary depth map defines the depth value of every point in the original image on a pixel or sub-pixel basis, and can be used for a variety of purposes such as for example, inserting one or more objects that occlude from the original image; depth correction on a regional basis (e.g. objects already contained in the original image); or overall depth correction of the original image. The Primary depth map, which may also be used for deriving one or more of the 3D metadata parameters described above, constitutes a mezzanine level from which one or more lower levels can be derived. Further details pertaining to 3D metadata and depth maps will be provided below using other figures.

The Secondary depth map is typically a block-based depth map and defines the foremost object for a certain portion (greater than a whole pixel) of an original image. The data that is provided by a Secondary depth map is generally not adequate for defining the edges of individual objects in the original image. Consequently, a Secondary depth map is not necessarily used for inserting new objects that are occluded by other objects present in the original image. However, in certain cases, the Secondary depth map may be used for inserting new objects that may be placed at a desired depth in front of objects present in the original image, without leading to an occlusion violation. This process may be implemented in various broadcast or playback devices, including mobile devices, associated with delivery of commercial 3D content.

Figure 4:
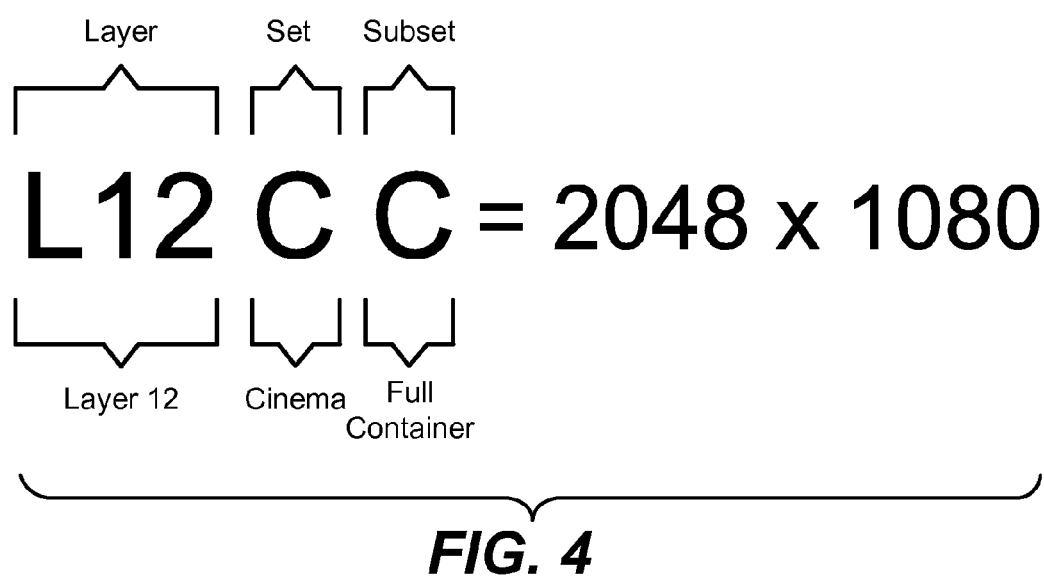
FIG. 4 shows one example of a profile header that provides information on a target resolution for an image.

The use of the Depth map, whether Primary or Secondary, permits providing different layers of depth information for satisfying a variety of usage demands. The usage demands range from a high level of complexity where pixel level information is used, to a low level where no depth map may be provided at all. In the absence of the depth map, only header information may be sent together with image data. In general, the different layers are defined by spatial resolution (i.e. the number of points representing the entire image). In one embodiment, each layer is typically configured to provide half as much image resolution as an adjacent higher layer, moving down from the original image resolution. For example, in broadcast and feature film applications, image resolutions may be based on formats such as High Definition (HD), 2K Cinema, or 4K Cinema. Accordingly, a suitable profile header is provided that may be used for determining absolute resolution values from a depth map. In this particular case, the profile header is defined as including a Layer designator, a Set designator and a Subset designator. FIG. 4 shows one example of a profile header that provides information on a target resolution for an image, in accordance with Layer 12, Cinema and Full Container.

FIGS. 5A and 5B provide layer and resolution information for several different profiles. Information for creating several profile headers (similar to the example header shown in FIG. 4) can be derived from the columns under the label "Profile."

Figure 6:
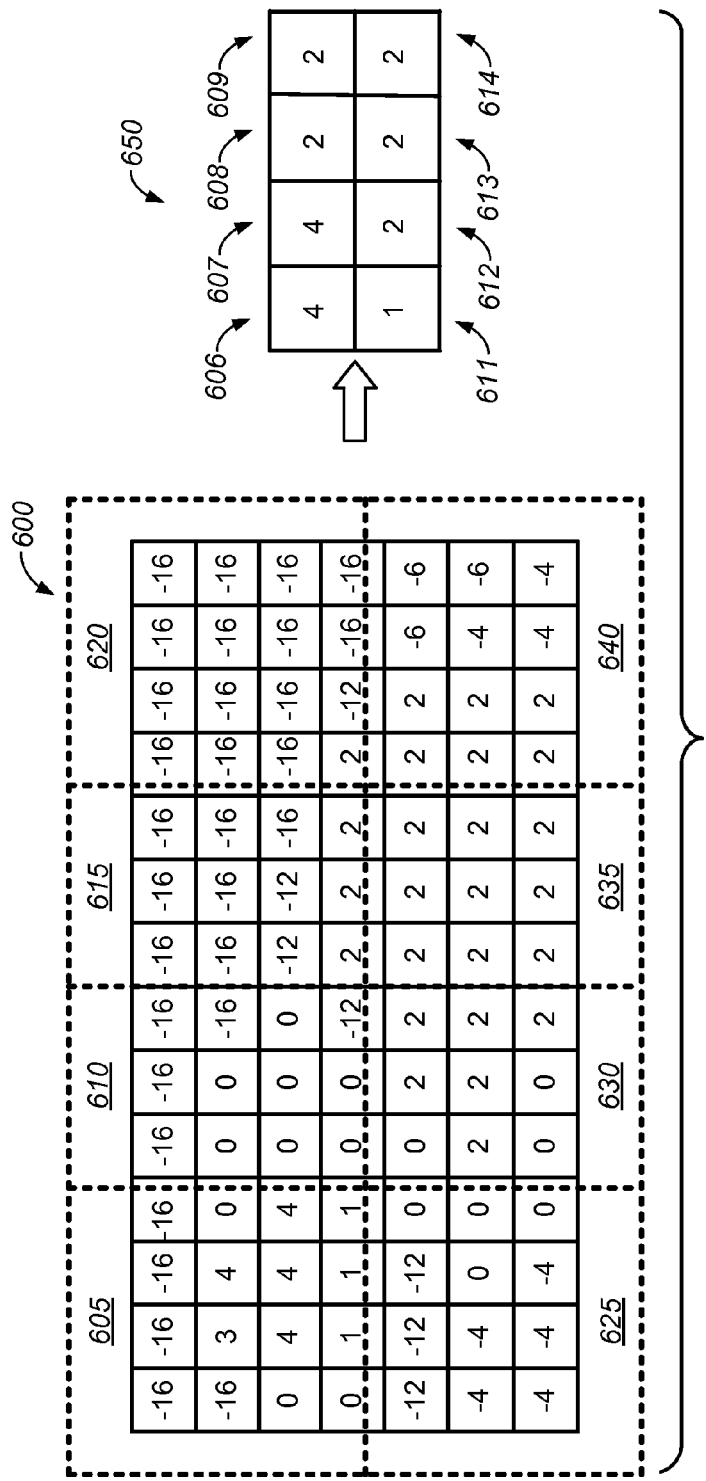
FIG. 6 shows one example of a block depth map together with a reduced block depth map.

Attention is now drawn to FIG. 6, which shows one example of a block depth map 600 together with a reduced block depth map 650. Block depth map 600 is a Secondary depth map in an "m×n" row-column format (in this example, 7×14) from which reduced block depth map 650 having a "p×q" row-column format (in this example, 2×4) can be derived using a cross-conversion process. The cross-conversion process may be used when the resolution values provided by block depth map 600 are not directly compatible to a particular application. As can be understood, it is desirable that the cross-conversion process preserves important information. In one embodiment, this is implemented by using multiple partitions and ensuring that the foremost values within each partition is used, even when these foremost values traverse the boundary of a partition.

To elaborate, the foremost value located in partition 605 is 4. This value (4) is cross-converted to block 606 in reduced block depth map 650. On the other hand, the foremost value (4) in partition 610 is located on the boundary between partitions 605 and 610. This value (4) is cross-converted to block 607 in reduced block depth map 650. Furthermore, the foremost value (2) in partition 615 is located on the boundary between partitions 615 and 635. This value (2) is cross-converted to block 608 in reduced block depth map 650. Similarly, the foremost value (1) in partition 625 is located on the boundary between partitions 625 and 605. This value (1) is cross-converted to block 611 in reduced block depth map 650. The foremost values in each of the other blocks 620, 630, 635 and 640 are cross-converted to corresponding blocks 609, 612, 613 and 614 respectively.

The rationale behind using the foremost values in the cross-conversion is based on two factors. The first factor is to ensure that the possibility of an occlusion violation is minimized or eliminated. The second factor is to ensure that at least the foremost depth value in each partition is accurate even if the rest of the partition has significantly lower depth values.

In the case wherein an object is to be inserted in a manner that intentionally causes an occlusion with reference to pre-existing objects, block depth map 600 may be avoided and a Primary depth map may be used instead, so as to ensure pixel-level occlusion accuracy. If an object (such as a broadcaster's logo, a caption, or a sub-title), is inserted into a 3D image without paying attention to the depths of various objects in the 3D image, there is a possibility that the inserted object may be erroneously rendered in front of an object, while simultaneously appearing to be located behind the object in terms of depth perception. As understood by a person of ordinary skill in the art, such a rendering violates depth cues in the Human Visual System (HVS), wherein if an object is hidden by another object, the hidden object must be spatially located behind the other object rather than in the front.

Furthermore, an undesirable breakdown in 3D visualization may take place when an object is inserted at a significantly different depth with reference to other objects located further behind the inserted object. This situation may be further compounded when multiple objects are inserted into an existing 3D image. In this case, the placement of the multiple objects has to be carried out not only with respect to existing objects in the image but also with respect to each other, so as to avoid occlusion violation between the inserted objects and existing objects, as well as occlusion violation between the inserted objects themselves.

There are several other 3D depth related operations that can be carried out upon an image in addition to the insertion of objects described above. In a first example application, a depth correction may be carried out upon an image in order to address issues such as for example, parallax errors and geometric defects. The depth correction may include techniques such as a parallax shifting, geometric correction, and/or complex image segmentation with edge warping. Whilst these techniques are not described in detail herein, it will be understood that parameters such as Maximum Depth (foremost) and Minimum Depth (rearmost) depth points may be used. More complex depth correction can be achieved by analysis of the overall depth distribution across the entire total depth of the image, and the use of ROI Depth and Average Depth may be applicable in this case.

In a second example application of a 3D depth related operation, one or more composite objects may be inserted into an image, with appropriate depth and occlusion.

In a third example application of a 3D depth related operation, a depth change operation and/or a depth normalization action may be carried out. The depth of a stereoscopic scene as perceived by a viewer varies when seen on different display devices. This perception is based on several factors such as screen size, pixel pitch and viewer distance from the display. A stereoscopic image created for a cinema screen may display a significantly lesser depth effect upon displaying of the image on a television screen, and even further reduction of depth effect when viewed on a screen of a mobile device. Similarly, a stereoscopic image that is optimized for 3D viewing on a mobile device may not provide adequate depth perception on a television screen, and may be unacceptable for viewing on a cinema screen as a result of extreme separation of objects in objects viewed by the left eye and right eye of the viewer. Such issues may be resolved by using the depth related solutions disclosed herein, in either an automatic manner or manually. The manual operation for controlling depth perception may be comparable to using a volume control for controlling the amplitude of sound.

Certain depth related issues may be addressed by normalizing image parameters using the depth metadata disclosed herein. Depth can be normalized in several different ways. In a first approach, the depth metadata is used to modify the image using a screen size and pixel width.

Several other depth related operations may be carried out upon an image, such as for example, sliding the left and right eye images with respect to each other; geometrically distorting the image; warping and/or segmentation and synthesis of the image.

Figure 7:
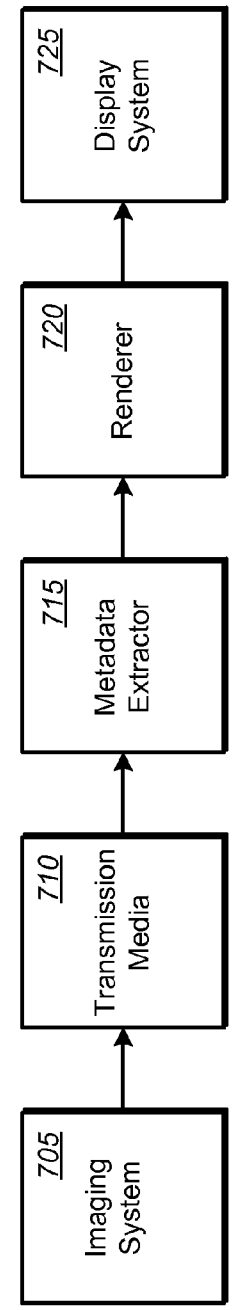
FIG. 7 shows an imaging system that includes various functional blocks associated with displaying an image from the time of image capture.

Attention is now drawn to FIG. 7, which shows an imaging system 700 that includes various functional blocks associated with transmitting of a combination of image data and 3D metadata, and using the combination at a receiving device for displaying a 3D image with appropriate perceived depth.

The block labeled imaging system 705 represents one or more devices, such as for example, an image capture system (a stereoscopic camera, a 3D camera, etc); a metadata generator for generating metadata that can be transmitted together with image data so as to provide perceived depth information to a distant receiver; and a transmitter unit for transmitting the image data and 3D metadata to the distant receiver.

In one embodiment, imaging system 705 transmits a profile header (such as the profile header shown in FIG. 4) together with a depth map (for example, one of the Primary or the Secondary depth map as described above), and 3D depth metadata.

The 3D depth metadata provides depth information in the form of z-axis values pertaining to maximum depth, minimum depth, and average depth of an image. The z-axis values may be provided in normalized form as $z_n$ values. The 3D metadata may further include a depth data profile and optionally, a region of interest (ROI) depth.

In another embodiment, imaging system 705 transmits only a profile header, which provides resolution information but does not include a depth map or 3D metadata.

Transmission media 710 represents a variety of communication media and networks (including the Internet) such as for example, wired media, wireless media, optical media etc that use a variety of physical entities associated with a signal transmission system, in a wide variety of signaling formats. Details of transmission media 705 is generally known to persons of ordinary skill in the art and will not be elaborated upon herein, in order to retain focus upon the main aspects of the invention.

Metadata extractor 715, which may be a part of a receiver unit, is used to derive 3D depth information from the signal transmitted by imaging system 705. Some non-limiting examples of receivers include Blu-ray video players, set-top boxes, software encoders, movie projectors, television sets, DVD players and video game machines. Additional applications include BD video encoders, players, and videodiscs created in the appropriate format, or content and systems targeted for applications such as broadcast, satellite, and IPTV systems.

Renderer 720 uses the 3D information provided by metadata extractor 715 and renders an image in accordance with the nature of the display system 725. For example, if the received profile header indicates a cinema full container format, renderer 720 may utilize the 3D depth metadata to modify the depth data contained in the image in order to display the image on display system 725, which may be a display on a handheld device such as a cellular phone or a personal digital assistant (PDA).

Figure 8:
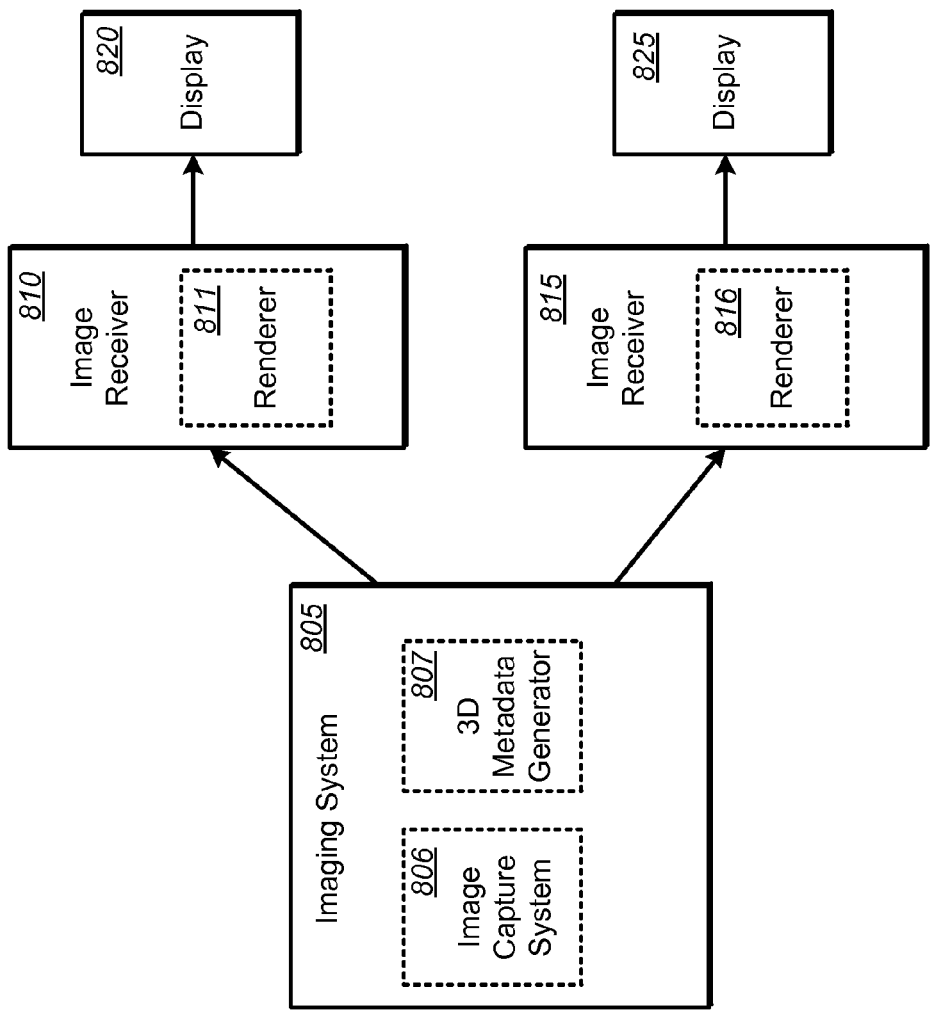
FIG. 8 shows one embodiment wherein 3D depth metadata is transmitted to two image receivers coupled to two different display screens having different sizes.

This aspect may be described further using FIG. 8, which shows image transmitter 805 transmitting image data to a first image receiver 810 and to a second image receiver 815. Image transmitter 805 may include an image capture system 806 and a 3D metadata extractor 807.

Either, or both, of the two image receivers may be a part of at least one of a communications device, a computer system, a video system, an audio-video system, an image capture device, an image display device, an image projection device, or an image transmission system.

In one embodiment, image transmitter 805 transmits a single profile to both image receivers. The single profile includes a first profile header (corresponding to a cinema, full-container as shown in FIG. 4), a first depth map, and a first 3D depth metadata.

Image receiver 810 is coupled to a cinema screen 820 that displays images in the format defined by the first profile header. Accordingly, renderer 811 uses the first depth map without modification of the depth data therein for displaying images on cinema screen 820. On the other hand, image receiver 815 is coupled to a screen 825 on a telephone. Screen 825 cannot display images in the format defined by the first profile header. Accordingly, renderer 816 uses the first depth map to derive a reduced block depth map (such as the one shown in FIG. 6) in order to enable viewing of images on screen 825.

In another embodiment, image transmitter 805 transmits the first profile to image receiver 810 and a different profile to image receiver 815. Each of receivers 810 and 815 use their respective profiles that are expressly tailored for displays 820 and 825 respectively. The normalized z-axis values are used in each case to render the correct depth values in the images displayed on displays 820 and 825 respectively.

In yet another embodiment, image transmitter 805 transmits multiple profiles to each of image receiver 810 and image receiver 815. Image receiver 810 selectively uses a first profile in the multiple profiles, while image receiver 815 selectively uses a different profile selected from amongst the multiple profiles. The multiple profiles may be transmitted in a variety of ways, for example, in a sequential arrangement, a parallel arrangement, or a multiplexed arrangement.

Figure 9:
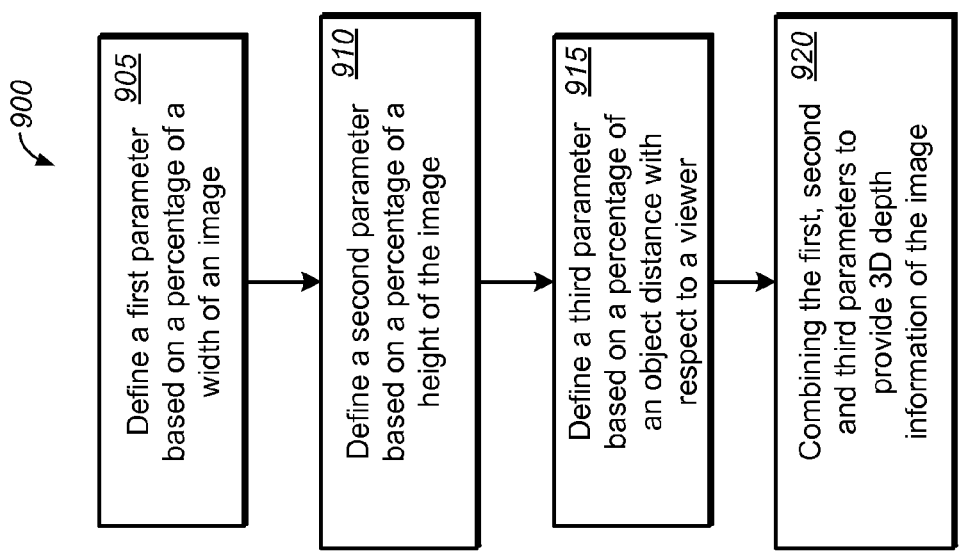
FIG. 9 shows a flowchart depicting one embodiment of a method providing 3D depth information.

Attention is now drawn to FIG. 9, which shows a flowchart 900 depicting one embodiment of a method providing 3D depth information. It is to be understood that any method steps or blocks shown in FIG. 9 represent modules, segments, or portions of code that include one or more executable instructions for implementing specific logical functions or steps in the method. In certain implementations, one or more of the steps may be performed manually. It will be appreciated that, although particular example method steps are described below, additional steps or alternative steps may be utilized in various implementations without detracting from the spirit of the invention. Moreover, steps may be executed out of order from that shown or discussed, including substantially concurrently or in reverse order, depending on various alternative implementations. Code may be also contained in one or more devices, and may not be necessarily confined to any particular type of device. The explanation below, while possibly implying code residency and functionality in certain devices, does so solely for the purposes of explaining concepts behind the invention, and should not be construed in a limiting manner.

In step 905, a first parameter is defined based on a percentage of a width of an image. In step 910, a second parameter is defined based on a percentage of a height of the image. In step 915, a third parameter is defined based on a percentage of an object distance from a viewer. Each of these parameters has been described above using FIGS. 2 and 3, for example. In step 920, the first, second and third parameters are combined to provide 3D depth information of the image.

The combination of the three parameters, for example of x, y, $z_n$ values (where x represents screen width as a percentage, y represents screen height as a percentage, and $z_n$ represents perceived depth as a percentage) can be transmitted from an image transmitter (such as imaging system 705 described above) and used at a receiving device (such as renderer 720 and display system 725 described above using FIG. 7) for reconstructing perceived depth in the image independent of display screen size or viewing distance.

Elaborating upon the aspect of image rendering in terms of reconstructing perceived depth, it is generally understood that screen size does play a significant role. Consequently, an approximate set of rules may be followed in order to accommodate various screen sizes. The description below provides one example of how device correction can be carried out in a receiving device so as to adjust "infinity" and provide a desired depth perception.

In this example, the image is reproduced on a display screen that is approximately 30 inches (76.8 cm) wide, 1920 pixel resolution, and 0.4 mm pixel pitch. The infinity point provides a negative separation of 65 mm with a separation of 162.5 pixels. The normalized display has a pixel pitch of 1 mm, thereby causing a reduction in left-right image pixel separation by 0.4. The image is corrected with a pixel shift of 48.75 pixels towards center for normalizing the image.

Convergence point for depth is set as follows:
a) Very large screen (Cinema/I-Max)=all depth in front (i.e. infinity is on the screen plane, maximum positive depth (in front of screen)=60% of viewer distance)
b) Large screen (Cinema)=more in front than behind (about ⅔ total depth in front, ⅓ total depth behind).
c) Small Screen (TV)=more behind than in front (about ⅓ total depth in front, ⅔ total depth behind).
d) Very small screen (mobile)=Infinity as far behind as possible, no positive depth (in front of screen)

Assuming that the original image was mastered with infinity point $z_{ni}=-100$ left right image shift where $z_{ci}$ is the corrected depth position for infinity, and maximum positive depth is $z_n=-40$. So the total depth in the scene is $z_n=60$.

For the above conditions, the following rules may be applied:
a) $z_{ci}=z_{ni}+100$ Infinity on screen plane, maximum object excursion out of screen 60% of viewer distance
b) $z_{ci}=z_{ni}+80$ Infinity 20% behind screen plane, maximum object excursion out of screen 40% of viewer distance c) $z_{ci}=z_{ni}+60$ Infinity 40% behind screen plane, maximum object excursion out of screen 20% of viewer distance d) $z_{ci}=z_{ni}+40$ Infinity 60% behind screen plane, no object excursion out of screen Device correcting the image could use a "Z-Norm" value in metadata, a flag to alert the receiving device that the received image may be corrected using the associated metadata to provide a desired shift for various size displays. Any display sizes falling between those described in the metadata could either interpolate an intermediate value or simply chose the closest value.

In one embodiment, over-scanned left and right eye images are sent in their entirety so as to allow corrections to be carried for two extreme display screen sizes (smallest and largest display screens).

FIG. 10 shows an extruded depth diagram of three objects to illustrate corrective calculations that may be carried out to provide desired depth perception. The three objects 955, 960 and 965 extrude from infinity plane 950. Object 955 is shown as protruding to a −50% z-norm position, object 960 to a 0 z-norm position, and object 965 to a 30% z-norm position. The absolute separation between the three objects is suitably adjusted in order to achieve these depths on different size displays. In this example, the three displays are a cinema screen, a television screen, and a screen of a mobile device (such as a portable media player or a cellphone). The attributed of these three devices are provided in Table 1 below.

TABLE 1

Display attributes

| Screen Type | Width (mm) | X Resolution (pixels) | Pixel Pitch (mm) |
|---|---|---|---|
| Cinema | 7000 | 1920 | 3.6458 |
| TV | 1000 | 1920 | 0.5208 |
| Mobile device | 75 | 960 | 0.0781 |

In order to display the three objects at a perceptual depth of Z-norm −50, 0 and +30, Table 2 shows pixel separation between the left eye and right eye images.

TABLE 2

Pixel separation

| Object | Applied Zn to Image, % | Px separation on Cinema screen | Px separation on TV screen | Px separation on Mobile screen |
|---|---|---|---|---|
| Square (965) | 30 | 7.6 | 53.5 | 356.6 |
| Triangle (960) | 0 | 0.0 | 0.0 | 0.0 |
| Circle (955) | −50 | −8.9 | −62.4 | −416.0 |

As can be seen from Table 2, the pixel separation for the cinema screen (large screen) is significantly less than that for the screen of the mobile device. Provided below is one example calculation to explain the values shown in Table 2.

Object 965 (square) has $z_n=30\%$. This value is plugged into the afore-mentioned equation for $S_p$ i.e.

$$S_p = z_n\left[\frac{65}{100-z_n}\right]$$

(when $z_n>0$)

$$S_p = 30\left[\frac{65}{100-30}\right] = 27.85 \text{ mm.}$$

Table 1 indicates that the pixel pitch for a cinema screen is 3.6458. Therefore, based on this pixel pitch and the $S_p$ value of 27.85 mm, the pixel separation for object 965 on a cinema screen is derived as 27.85/3.6458=7.6 (column 3 of Table 1, corresponding to the cinema screen).

Similarly, for object 955 (circle) where $z_n=-50\%$, the $S_p$ value is −50(0.65)=−32.5, and the pixel separation is −32.5/3.6458=−8.9 for displaying object 955 on a cinema screen (column 3 of Table 1, corresponding to the cinema screen).

The methods and systems described herein may be implemented in hardware, software, firmware or combination thereof. Features described as steps, blocks, modules or components may be implemented together (e.g., in a logic device such as an integrated logic device) or separately (e.g., as separate connected logic devices). The software portion of the methods of the present disclosure may comprise a computer-readable storage medium in which is stored instructions that, when executed by a computer system, execute all or parts of the described methods. The computer-readable storage medium may comprise, for example, a random access memory (RAM) and/or a read-only memory (ROM). At least a portion of the instructions may be executed by a processor (e.g., a microprocessor, a microcontroller, a digital signal processor (DSP), or implemented as a hardware circuit in an application specific integrated circuit (ASIC), a standard logic integrated circuit, or a field programmable logic array (PLD, FPGA etc.)).

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The examples set forth above are provided to give those of ordinary skill in the art a complete disclosure and description of how to make and use the embodiments of the enhancement methods for sampled and multiplexed image and video data of the disclosure, and are not intended to limit the scope of what the inventors regard as their disclosure. Modifications of the above-described modes for carrying out the disclosure may be used by persons of skill in the video art, and are intended to be within the scope of the following claims.

A number of embodiments of the disclosure have been described. Nevertheless, it will be understood that various modifications may be made without departing from the spirit and scope of the present disclosure. Accordingly, other embodiments are within the scope of the following claims.

The invention claimed is:

1. A method of rendering 3D images, comprising:
receiving a profile comprising a profile header, from a source device and independent of display screen size, a depth map, and 3D depth metadata, wherein the 3D depth metadata comprises data for multiple target display resolutions from a source device and said 3D depth metadata is independent of display screen size;
using the depth map to derive depth data that is independent of display screen size and viewing distance, wherein the depth data comprises normalized z-axis values based on a plurality of depth points, the normalized z-axis values defining the relative position of an imaged object with respect to a human viewer, wherein the profile header comprises a layer identifier, a set identifier, and a subset identifier, and provides target resolution information for which the profile was created; and
providing in their entirety over-scanned left and right eye images of the 3D images;
wherein the plurality of depth points is based at least in part on a location where a human viewer is located, a display screen plane, and an infinity plane;
providing the depth map in the form of a first block depth map having m rows and n columns, wherein m does not equal n; and
converting the first block depth map having m rows and n columns into a reduced block depth map having p rows and q columns wherein m>p and n>q;
wherein a first normalized z-axis value of the normalized z-axis values is defined as substantially equal to zero when the imaged object is perceived as to be located on the display screen plane, and a second normalized z-axis value of the normalized z-axis values is defined as approximately equal to −100 when the object is perceived to be located on the infinity plane;
wherein the depth map is represented as a primary depth map and a secondary depth map, wherein the primary depth map provides depth values of an image at a pixel level or a sub-pixel level; and the secondary depth map is a block depth map that provides depth values at a greater-than-a-pixel level;
wherein the converting comprises:
partitioning the first block depth map having m rows and n columns into p×q partitions, wherein each partition comprises a plurality of depth values; and
using the foremost depth values contained in each of the p×q partitions to identify corresponding depth values in the reduced block depth map having p rows and q columns, wherein the foremost value within a partition is used even when it traverses a boundary of the partition.

2. The method of claim 1, wherein the 3D depth metadata comprises:
maximum depth data comprising a first normalized z-axis value derived from a foremost part of the image;
minimum depth data comprising a second normalized z-axis value derived from a rearmost part of the image; and
average depth data comprising an average normalized z-axis value derived from substantially all parts of the image.

3. The method of claim 2, wherein the 3D depth metadata further comprises:
a region of interest depth data that indicates an average depth in at least one of a) a primary object in the image or b) a portion of interest in the image.

4. The method of claim 1, further comprising: analyzing the primary depth map for extracting the 3D depth metadata.

5. The method of claim 1, further comprising: using at least one of the first block depth map or the reduced block depth map to avoid occlusion violation when inserting a new object into the image.

6. The method of claim 1 further comprising:
using the 3D depth metadata contained in the profile to avoid occlusion violation when inserting a new object into the image.

7. The method of claim 6, wherein the new object is at least one of a caption, a subtitle, or a graphic.

8. The method of claim 1, wherein the depth data provided by the depth map includes a first parameter based on a percentage of a width of the image; a second parameter based on a percentage of a height of the image; and a third parameter based on a percentage of an object distance with respect to at least one of a screen and/or a human viewer.

9. A non-transitory computer-readable storage medium having stored thereon computer-executable instructions for executing a method with one or more processors in accordance with claim 1.

* * * * *